United States Patent
Higuchi et al.

(10) Patent No.: US 11,512,151 B2
(45) Date of Patent: Nov. 29, 2022

(54) METHOD FOR PRODUCING MODIFIED POLYTETRAFLUOROETHYLENE, METHOD FOR PRODUCING MODIFIED POLYTETRAFLUOROETHYLENE POWDER, AND METHOD FOR PRODUCING STRETCHED POROUS MATERIAL

(71) Applicant: AGC Inc., Chiyoda-ku (JP)

(72) Inventors: Shinya Higuchi, Chiyoda-ku (JP); Shiro Ebata, Chiyoda-ku (JP); Takehiro Kose, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/814,106

(22) Filed: Mar. 10, 2020

(65) Prior Publication Data

US 2020/0207880 A1 Jul. 2, 2020

Related U.S. Application Data

(63) Continuation of application No. PCT/JP2018/035475, filed on Sep. 25, 2018.

(30) Foreign Application Priority Data

Sep. 28, 2017 (JP) .............. JP2017-187968

(51) Int. Cl.
| | |
|---|---|
| C08F 2/16 | (2006.01) |
| C08F 214/26 | (2006.01) |
| C08J 3/16 | (2006.01) |
| C08F 265/04 | (2006.01) |

(52) U.S. Cl.
CPC ............ C08F 2/16 (2013.01); C08F 214/265 (2013.01); C08F 265/04 (2013.01); C08J 3/16 (2013.01)

(58) Field of Classification Search
CPC combination set(s) only.
See application file for complete search history.

(56) References Cited

U.S. PATENT DOCUMENTS 3,407,247 A * 10/1968 Reinhardt ............. C08F 291/00
525/276
5,523,346 A * 6/1996 Wu ....................... C08F 265/04
524/805
2008/0114121 A1* 5/2008 Brothers ................ C08F 14/18
524/599
2008/0114143 A1* 5/2008 Brothers ................ C08F 14/18
528/26
2009/0221776 A1* 9/2009 Durali ..................... C08F 14/18
526/249
2010/0036073 A1* 2/2010 Aten ..................... C08F 214/26
526/247
2015/0299342 A1 10/2015 Nanba
2018/0072829 A1 3/2018 Amin-Sanayei et al.
2018/0142043 A1* 5/2018 Higuchi ................ B29C 48/288

FOREIGN PATENT DOCUMENTS

| JP | 6-263806 A | 9/1994 |
|---|---|---|
| JP | 2006-322011 A | 11/2006 |
| JP | 2015-45030 A | 3/2015 |
| JP | 2015-232082 A | 12/2015 |
| JP | 2017-57379 A | 3/2017 |
| RU | 2 425 056 C2 | 7/2011 |
| WO | WO 2009/137736 A1 | 11/2009 |
| WO | WO 2010/017455 A1 | 2/2010 |
| WO | WO 2014/084400 A1 | 6/2014 |
| WO | WO 2016/149238 A1 | 9/2016 |
| WO | WO 2017030094 A1 | 2/2017 |

OTHER PUBLICATIONS

International Search Report dated Dec. 25, 2018 in PCT/JP2018/035475 filed Sep. 25, 2018, 2 pages.
Masato Sakaguchi, et al., "Copolymerizations Initiated by Mechano-Radicals on Particle Surfaces of Poly(tetrafluoroethylene)," Journal of Applied Polymer Science, vol. 22, XP055786956, 1978, pp. 2915-2924.

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

A method for producing a modified polytetrafluoroethylene, the method including: polymerizing tetrafluoroethylene in an aqueous medium in which a polymer having units based on a fluorine-free monomer is present. The fluorine-free monomer is a monomer represented by formula (1): $CH_2=CR^1$-L-$R^2$, where $R^1$ is a hydrogen atom or an alkyl group, L is a single bond, —CO—O—*, —O—CO—* or —O—, * is a bonding position to $R^2$, and $R^2$ is an alkyl group. To the total amount of tetrafluoroethylene supplied to the polymerization, a proportion of the polymer is from 0.001 to 0.050 mass %.

20 Claims, No Drawings

METHOD FOR PRODUCING MODIFIED POLYTETRAFLUOROETHYLENE, METHOD FOR PRODUCING MODIFIED POLYTETRAFLUOROETHYLENE POWDER, AND METHOD FOR PRODUCING STRETCHED POROUS MATERIAL

TECHNICAL FIELD

The present invention relates to a method for producing a modified polytetrafluoroethylene, a method for producing a modified polytetrafluoroethylene powder, and a method for producing a stretched porous material.

BACKGROUND ART

A polytetrafluoroethylene is used in various applications because of its excellent properties.

As one method for producing a polytetrafluoroethylene, emulsion polymerization of tetrafluoroethylene may be mentioned. At the time of the emulsion polymerization, a fluorinated surfactant containing fluorine atoms is usually employed as an emulsifier (Patent Document 1).

PRIOR ART DOCUMENT

Patent Document

Patent Document 1: WO2009/137736

DISCLOSURE OF INVENTION

Technical Problem

On the other hand, in recent years, from the viewpoint of environmental problems, types of the fluorinated surfactant to be used, have been restricted, and it is desired that in the future, a polytetrafluoroethylene is obtained without using a fluorinated surfactant.

The present invention has an object to provide a novel method for producing a modified polytetrafluoroethylene.

Further, the present invention also has an object to provide a method for producing a modified polytetrafluoroethylene powder, and a method for producing a stretched porous material.

Solution to Problem

The present inventors have made intensive studies to achieve the above objects, and, as a result, have found that the above objects can be achieved by the following constructions.

(1) A method for producing a modified polytetrafluoroethylene, which comprises polymerizing tetrafluoroethylene in an aqueous medium in which a polymer comprising units based on a fluorine-free monomer is present.
(2) The method according to (1), wherein the fluorine-free monomer is a monomer represented by the formula (1):

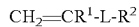

$$CH_2=CR^1\text{-}L\text{-}R^2 \quad \text{Formula (1)}$$

wherein $R^1$ represents a hydrogen atom or an alkyl group, L represents a single bond, —CO—O—*, —O—CO—* or —O—, * represents a bonding position to $R^2$, and $R^2$ represents a hydrogen atom, an alkyl group or a nitrile group.
(3) The method according to (1) or (2), wherein the content proportion of the units based on a fluorine-free monomer in the polymer is from 90 to 100 mass % to the total amount of monomer units which the polymer contains.
(4) The method according to any one of (1) to (3), wherein to the total amount of tetrafluoroethylene which is supplied to the polymerization system, the proportion of the polymer is from 0.001 to 0.050 mass %.
(5) The method according to any one of (1) to (4), wherein tetrafluoroethylene is polymerized in the presence of a fluorine-free surfactant.
(6) The method according to (5), wherein the fluorine-free surfactant is a hydrocarbon type surfactant.
(7) The method according to (5) or (6), wherein the amount of the fluorine-free surfactant in the aqueous medium, as expressed as a proportion to the total amount of tetrafluoroethylene which is supplied to the polymerization system, is from 0.01 to 0.50 mass %.
(8) The method according to any one of (1) to (7), wherein tetrafluoroethylene is polymerized in the presence of a stabilizing aid.
(9) The method according to any one of (1) to (8), wherein the fluorine-free monomer is polymerized in an aqueous medium, and then in the obtained aqueous medium containing the polymer, tetrafluoroethylene is polymerized.
(10) The method according to (9), wherein tetrafluoroethylene is polymerized by adding a polymerization initiator to the aqueous medium in which the fluorine-free monomer is polymerized, in such an amount that the proportion of the polymerization initiator becomes to be at least 0.10 mass % to the total amount of tetrafluoroethylene which is supplied to the polymerization system.
(11) The method according to (9) or (10), wherein polymerization is carried out while supplying tetrafluoroethylene to the polymerization system, and a fluorine-free surfactant is added to the polymerization system between the initiation and termination of the supply of tetrafluoroethylene.
(12) The method according to any one of (9) to (11), wherein the fluorine-free monomer is polymerized in an aqueous medium containing a stabilizing aid, and tetrafluoroethylene is polymerized in the obtained aqueous medium containing the stabilizing aid.
(13) The method according to (12), wherein the stabilizing aid is a paraffin wax.
(14) A method for producing a modified polytetrafluoroethylene powder, which comprises producing an aqueous dispersion having particles of a modified polytetrafluoroethylene dispersed in an aqueous medium by the method as defined in any one of (1) to (13), and then, coagulating the particles to produce a powder of a modified polytetrafluoroethylene.
(15) A method for producing a stretched porous material, which comprises subjecting the modified polytetrafluoroethylene powder prepared by the method as defined in (14) to paste extrusion to obtain an extruded bead, and then stretching the extruded bead to produce a stretched porous material.

Advantageous Effects of Invention

According to the present invention, it is possible to provide a novel method for producing a modified polytetrafluoroethylene.

Further, according to the present invention, it is possible to provide a method for producing a modified polytetrafluoroethylene powder, and a method for producing a stretched porous material.

DESCRIPTION OF EMBODIMENTS

Meanings of the terms in the present invention are as follows.

A "unit" is a general term for an atomic group which is derived from one molecule of a monomer and which is formed directly by polymerization of the monomer.

A characteristic point of the method for producing a modified polytetrafluoroethylene (hereinafter referred to also as a "modified PTFE") of the present invention may be such a point that polymerization of tetrafluoroethylene (hereinafter referred to also as "TFE") is conducted in the presence of a polymer (hereinafter referred to also as a "specific polymer") comprising units based on a fluorine-free monomer. At the time of carrying out the polymerization of TFE in the aqueous medium, due to the later-described estimated mechanism of the specific polymer, the polymerization of TFE is considered to proceed satisfactorily as a result. According to the production method of the present invention, it is possible to produce a modified PTFE without using a fluorinated surfactant.

The specific polymer is estimated to substitute at least part of the effects obtainable in the case of using a fluorinated surfactant, such as dispersibility of PTFE particles formed, etc., in place of the fluorinated surfactant. At the time of the polymerization of TFE, it is also possible to use a fluorine-free surfactant to substitute another part of the effects obtainable in the case of using a fluorinated surfactant.

The amount of the specific polymer in the modified PTFE of the present invention is, as described below, a very small amount (e.g. at most 0.050 mass %), and therefore, the amount of the specific polymer in the aqueous medium containing the specific polymer, in which TFE is polymerized, is also a very small amount. Thus, the aqueous medium containing the specific polymer in which TFE is to be polymerized, is preferably an aqueous medium obtainable by polymerizing a fluorine-free monomer in an aqueous medium. In such a case, the specific polymer in the aqueous medium is, as described below, considered to be dispersed in the aqueous medium in a particulate form.

The aqueous medium containing the specific polymer to be used for the polymerization of TFE, may be an aqueous medium obtainable by polymerizing a fluorine-free monomer in an aqueous medium, or an aqueous medium obtainable by further diluting the aqueous medium obtained by polymerizing a fluorine-free monomer in the aqueous medium, with an aqueous medium.

In a case where the aqueous medium obtainable by polymerizing a fluorine-free monomer in the aqueous medium, is to be used as it is, it is preferred that the fluorine-free monomer is polymerized in a polymerization system (polymerization vessel, or the like) for polymerizing TFE, and continuously the polymerization of TFE is carried out in the same polymerization system. In the case of using the aqueous medium obtainable by polymerizing a fluorine-free monomer in the aqueous medium, by diluting it, polymerization of TFE may be carried out in the same polymerization system, or polymerization of TFE may be carried out in another polymerization system.

As one preferred embodiment of the method for producing a modified PTFE, an embodiment having the following two steps may be mentioned.

Step 1: a step of conducting polymerization of a fluorine-free monomer in an aqueous medium, to obtain an aqueous medium containing a specific polymer Step 2: a step of conducting polymerization of TFE in the aqueous medium containing a specific polymer, to obtain a modified PTFE.

As mentioned above, the aqueous medium containing a specific polymer obtained in step 1 may be used as the aqueous medium containing a specific polymer in step 2 by diluting it with an aqueous medium. Further, before initiating the polymerization of TFE in step 2, such an additive as described below may be added to the aqueous medium containing the specific polymer, and then the polymerization of TFE may be carried out. Depending upon the case, the additive to be used in the polymerization of TFE may be added to an aqueous medium to be used in step 1, so that in step 1, an aqueous medium containing the additive and the specific polymer, is obtained, and the obtained aqueous medium may be used as the aqueous medium in step 2.

Hereinafter, the present invention will be described in detail with reference to the above preferred embodiment as an example.

<Step 1>

In the following, first, materials to be used in step 1 will be described in detail, and then, the procedure in step 1 will be described in detail.

(Fluorine-Free Monomer)

A fluorine-free monomer is a monomer containing no fluorine atoms.

A fluorine-free monomer usually has a polymerizable group, and the number of polymerizable groups is preferably from 1 to 3, more preferably 1.

As the polymerizable group, an ethylenically unsaturated group is preferred. More specifically, an acryloyl group, a methacryloyl group, a vinyl ether group, a vinyl ester group, a vinyl group, or an allyl group, may be mentioned, and an acryloyl group, a methacryloyl group, a vinyl ester group, or a vinyl ether group is preferred.

As the fluorine-free monomer, a monomer represented by the formula (1) is preferred.

$CH_2=CR^1-L-R^2$      Formula (1)

$R^1$ represents a hydrogen atom or an alkyl group. The number of carbon atoms in the alkyl group is preferably from 1 to 3, more preferably 1.

L represents a single bond, —CO—O—*, —O—CO—* or —O—. * represents a bonding position to $R^2$. For example, when L is a —CO—O—*, the formula (1) represents $CH_2=CR^1-CO-O-R^2$.

$R^2$ represents a hydrogen atom, an alkyl group or a nitrile group.

The number of carbon atoms in the alkyl group is preferably from 1 to 10, more preferably from 1 to 6, further preferably from 1 to 4.

The alkyl group may be linear or may be cyclic. When the alkyl group is cyclic, it corresponds to a cycloalkyl group.

The monomer represented by the formula (1) is preferably a monomer selected from the group consisting of a monomer represented by the formula (1-1), a monomer represented by the formula (1-2), a monomer represented by the formula (1-3) and a monomer represented by the formula (1-4).

$CH_2=CR^1-CO-O-R^3$      Formula (1-1)

$CH_2=CR^1-O-CO-R^4$      Formula (1-2)

$CH_2=CR^1-O-R^5$      Formula (1-3)

$CH_2=CR^1-R^6$      Formula (1-4)

The definition of $R^1$ is as described above.

$R^3$ represents a hydrogen atom or an alkyl group, preferably an alkyl group having from 1 to 6 carbon atoms.

$R^4$ represents an alkyl group, preferably an alkyl group having from 1 to 3 carbon atoms, more preferably a methyl group.

$R^5$ represents an alkyl group, and is preferably a linear alkyl group or a cyclic alkyl group.

$R^6$ represents a nitrile group.

The fluorine-free monomer may, for example, be methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, or cyclohexyl vinyl ether.

As the fluorine-free monomer, one type may be used alone, or two or more types may be used in combination.

As the fluorine-free monomer, a monomer represented by the above formula (1-1) and a monomer represented by the above formula (1-2) are more preferred, and a monomer represented by the above formula (1-1) wherein $R^3$ is an alkyl group is particularly preferred. A monomer represented by the above formula (1-1) and a monomer represented by the above formula (1-2) have an ester group or a carboxy group being a hydrophilic group, whereby such a monomer or its polymer has a hydrophilicity. Thus, particularly at a low concentration, such a monomer or its polymer is considered to be stably dispersed in an aqueous medium without requiring a surfactant.

(Specific Polymer)

The specific polymer is comprised of a polymer comprising units based on a fluorine-free monomer.

The specific polymer usually contains only units based on the fluorine-free monomer, but it may contain units based on a fluorinated monomer within a range not to impair the effects of the present invention. The fluorinated monomer is a monomer having fluorine atoms, and, for example, TFE may be mentioned.

In a case where an aqueous medium containing the specific polymer is produced in step 1, and continuously the polymerization of TFE in step 2 is conducted in the specific polymer-containing aqueous medium in the polymerization system used in step 1, there may be a case where the specific polymer-containing aqueous medium containing an unreacted fluorine-free monomer or a specific polymer in the middle of polymerization is used in step 2. Moreover, there may be a case where the atmosphere in the polymerization system in step 1, is made to be a TFE-containing atmosphere in consideration of step 2. In such cases, it is considered that part of the specific polymer in step 2 may become a polymer containing TFE units.

Further, from another viewpoint, it is considered that the modified PTFE particles obtainable in step 2 are not limited to particles made of a physical mixture of the specific polymer and PTFE, but may be particles containing a TFE copolymer having units based on the fluorine-free monomer.

The content of units based on the fluorine-free monomer in the specific polymer is preferably at least 90 mass %, more preferably at least 95 mass %, to all units in the specific polymer. The upper limit may be 100 mass %.

(Aqueous Medium)

The aqueous medium may, for example, be water, or a mixture of water and a water-soluble organic solvent.

The water-soluble organic solvent may, for example, be tert-butanol, propylene glycol, or dipropylene glycol. In the case of a mixture of water and a water-soluble organic solvent, the concentration of the water-soluble organic solvent is preferably at most 10 mass %.

The aqueous medium is preferably made of water only.

(Polymerization Initiator)

In step 1, a polymerization initiator may be used. That is, at the time of polymerization of the fluorine-free monomer, a polymerization initiator may be used.

As the polymerization initiator, a water-soluble radical initiator or a water-soluble redox catalyst is preferred.

The water-soluble radical initiator is preferably a persulfate such as ammonium persulfate or potassium persulfate, or a water-soluble organic peroxide such as disuccinic acid peroxide, bisgluraric acid peroxide or tert-butyl hydroperoxide.

The water-soluble redox catalyst is preferably a combination of an oxidizing agent such as bromic acid or a salt thereof, chloric acid or a salt thereof, persulfuric acid or a salt thereof, permanganic acid or a salt thereof, or hydrogen peroxide, and a reducing agent such as sulfurous acid or a salt thereof, bisulfite or a salt thereof, thiosulfuric acid or a salt thereof, or an organic acid. Among them, a combination of bromic acid or a salt thereof, with sulfurous acid or a salt thereof, or with ammonium sulfite, or a combination of permanganic acid or a salt thereof, or potassium permanganate, with oxalic acid, is more preferred.

As the polymerization initiator, ammonium persulfate alone or a mixed system of a persulfate and disuccinic acid peroxide is preferred; ammonium persulfate alone or a mixed system of ammonium persulfate and disuccinic acid peroxide is more preferred; and ammonium persulfate alone is further preferred.

As the polymerization initiator, one type may be used alone, or two or more types may be used in combination.

Further, as the method for charging the polymerization initiator, the entire amount may be charged to the polymerization system before initiation of the polymerization reaction, or it may be continuously or intermittently added to the polymerization system.

(Other Materials)

Additives other than the above may be contained in the aqueous medium to be subjected to the polymerization of the fluorine-free monomer. As additives other than the above, additives which are contained in the aqueous medium in the later-described step 2 and which do not disturb the polymerization of the fluorine-free monomer in step 1 may be mentioned. Such additives may, for example, be a stabilizing aid and a fluorine-free surfactant.

As mentioned above, the content of the specific polymer in the aqueous medium obtainable in step 1 is extremely small, and without using a fluorine-free surfactant, a stable specific polymer-containing aqueous medium is obtainable, whereby it is not essential to use a fluorine-free surfactant in step 1.

(Procedure in Step)

In step 1, polymerization of the fluorine-free monomer is conducted in an aqueous medium. Specifically, it is preferred to mix the fluorine-free monomer and the aqueous medium and to conduct polymerization of the fluorine-free monomer in the obtained mixed solution.

Here, as the method for charging the fluorine-free monomer, the initial batch addition is preferred in which the entire amount is charged to the polymerization system before initiation of the polymerization reaction.

The content of the fluorine-free monomer in the mixed solution obtainable by mixing the fluorine-free monomer and the aqueous medium, is preferably from 0.0005 to 0.0080 mass %, more preferably from 0.0005 to 0.0030 mass %, to the entire mass of the mixed solution. The fluorine-free monomer usually undergoes polymerization in its entire amount to form a specific polymer, whereby the concentration of the specific polymer in the obtained specific polymer-containing aqueous medium will be within the above numerical value range.

The above-mentioned fluorine-free monomer concentration and specific polymer concentration are concentrations in a case where the obtained specific polymer-containing aqueous medium is used in step 2 without being diluted with an aqueous medium. In a case where the obtained specific polymer-containing aqueous medium is diluted with an aqueous medium to the above-mentioned specific polymer concentration, and the diluted liquid is used in step 2, a specific polymer-containing aqueous medium having a high concentration corresponding to the dilution ratio is produced in step 1. The dilution ratio is not particularly limited, but is preferably at most 10 times.

The amount of the polymerization initiator to be used, is preferably from 0.2 to 1,000 mass %, more preferably from 0.2 to 500 mass %, to the entire amount of the fluorine-free monomer.

The polymerization temperature of the fluorine-free monomer is preferably from 10 to 95° C., more preferably from 50 to 90° C. The polymerization time is preferably from 5 to 400 minutes, more preferably from 5 to 300 minutes.

The pressure condition at the time of the polymerization is preferably a vacuum condition or an atmospheric condition.

Further, the polymerization may be carried out by setting the atmosphere at the time of the polymerization to be a TFE atmosphere. Usually, the polymerization of the fluorine-free monomer in the aqueous medium proceeds in preference to the polymerization of TFE.

In the above step 1, an aqueous medium containing the specific polymer is obtainable. The specific polymer is considered to be dispersed in the aqueous medium in the form of particles. At the time of polymerization of TFE in step 2 as described later, although the specific polymer is not an emulsifier, it is considered that due to the balance of interfacial tension to both the aqueous medium and the modified PTFE particles in the middle of polymerization, the specific polymer is present at both boundaries, and thus contributes to the dispersion stabilization in the aqueous medium of the modified PTFE particles. The modified PTFE particles obtained in step 2 contain the specific polymer. The particle size of the specific polymer particles is preferably from 0.1 to 100 nm, more preferably from 0.1 to 50 nm.

<Step 2>

Step 2 is a step of conducting polymerization of TFE in the aqueous medium containing the specific polymer to obtain a modified PTFE.

In the following, first, materials to be used in step 2 will be described in detail, and then, the procedure in step 2 will be described in detail.

(Aqueous Medium Containing Specific Polymer)

As the aqueous medium containing the specific polymer in step 2, the aqueous medium containing the specific polymer as obtained in step 1, or an aqueous medium containing the specific polymer, obtainable by diluting the aqueous medium containing the specific polymer as obtained in step 1, with an aqueous medium, is used.

The amount of the specific polymer in the specific polymer-containing aqueous medium to be used in polymerization of TFE, is preferably from 0.001 to 0.050 mass %, more preferably from 0.001 to 0.020 mass %, further preferably from 0.002 to 0.020 mass %, still further preferably from 0.003 to 0.015 mass %, particularly preferably from 0.003 to 0.010 mass %, to the total amount of TFE to be supplied to the polymerization system.

(Polymerization Initiator)

In step 2, a polymerization initiator may be used. That is, a polymerization initiator may be used at the time of the polymerization of TFE.

The polymerization initiator to be used, may be a polymerization initiator as described in step 1.

As the polymerization initiator, a mixed system of a persulfate and disuccinic acid peroxide is preferred, and a mixed system of ammonium persulfate and disuccinic acid peroxide is more preferred.

The amount of the polymerization initiator is preferably at least 0.10 mass %, more preferably from 0.10 to 1.5 mass %, further preferably from 0.20 to 1.0 mass %, to the total amount of TFE to be supplied to the polymerization system.

(Fluorine-Free Surfactant)

In step 2, it is preferred to use a fluorine-free surfactant together with the specific polymer. That is, it is preferred to carry out polymerization of TFE in the presence of a fluorine-free surfactant together with the specific polymer.

The fluorine-free surfactant is a surfactant having a hydrophobic portion composed of an organic group containing no fluorine atoms. The fluorine-free surfactant preferably contains no fluorine atoms in a portion other than the hydrophobic portion such as a hydrophilic portion, etc.

As the fluorine-free surfactant, a hydrocarbon type surfactant is preferred. The hydrocarbon type surfactant is a surfactant wherein the hydrophobic portion is made of a hydrocarbon. The hydrocarbon type surfactant may be any of anionic, nonionic and cationic, and a hydrocarbon type anionic surfactant is preferred. Here, in the above hydrocarbon, an oxygen atom (—O—) may be contained. That is, it may be a hydrocarbon containing oxyalkylene units.

The number of carbon atoms contained in the above hydrocarbon group is preferably from 5 to 20.

The amount of the fluorine-free surfactant to be used, is preferably from 0.01 to 0.50 mass %, more preferably from 0.01 to 0.30 mass %, further preferably from 0.05 to 0.30 mass %, to the total amount of TFE to be supplied to the polymerization system.

The counter cation to the anion of the hydrocarbon type anionic surfactant may, for example, be $H^+$, $Na^+$, $K^+$, $NH(EtOH)_3^+$ or the like.

The hydrocarbon type anionic surfactant may, for example, be sodium dodecyl sulfate, sodium lauryl sulfate, ammonium lauryl sulfate, polyoxyethylene lauryl ether sodium sulfate, polyoxyethylene lauryl ether ammonium sulfate, sodium dodecylbenzenesulfonate, sodium di(2-ethylhexyl)sulfosuccinate, sodium laurate, or ammonium laurate.

As the hydrocarbon type surfactant, one type may be used alone, or two or more types may be used in combination.

(Aqueous Medium)

The aqueous medium may, for example, be water or a mixture of water and a water-soluble organic solvent. The water-soluble organic solvent may be the solvent exemplified in step 1.

In a case where the specific polymer-containing aqueous medium obtained in step 1 is to be used without being diluted, the aqueous medium in step 2 is the same as the aqueous medium in step 1. In a case where the specific polymer-containing aqueous medium obtained in step 1 is to be used as being diluted, the same applies in a case where the aqueous medium to be used for diluting is the same aqueous medium as the aqueous medium used in step 1.
(Stabilizing Aid)

In step 2, it is preferred to use a stabilizing aid which is commonly used in emulsion polymerization for PTFE. Since the stabilizing aid is not one which interferes with polymerization of the fluorine-free monomer in step 1, polymerization of a fluorine-free monomer may be conducted by letting it be present in the aqueous medium used in step 1, and the obtained specific polymer-containing aqueous medium containing the stabilizing aid may be used in step 2.

As the stabilizing aid, paraffin wax, a fluorinated solvent or silicone oil is preferred, and paraffin wax is more preferred. The paraffin wax may be liquid, semi-liquid or solid at room temperature. Especially, a saturated hydrocarbon having at least 12 carbon atoms, is preferred. The melting point of the paraffin wax is preferably from 40 to 65° C., more preferably from 50 to 65° C.

As the stabilizing aid, one type may be used alone, or two or more types may be used in combination.

The amount of the stabilizing aid is preferably from 2 to 20 mass %, more preferably from 5 to 20 mass %, to the total amount of TFE to be supplied to the polymerization system.
(Procedure in Step)

Before initiating polymerization of TFE in step 2, the above-mentioned additives are added to the polymerization system in which the specific polymer-containing aqueous medium is disposed, and the polymerization of TFE is conducted.

TFE is introduced into the polymerization system in a usual way. Specifically, TFE is continuously or intermittently introduced into the polymerization system so that the polymerization pressure becomes to be a predetermined pressure.

The additives may be added all at once to the polymerization system, or may be added as divided.

The polymerization initiator is preferably dividedly added corresponding to the supply amount of TFE.

The fluorine-free surfactant may be added to the polymerization system before initiating polymerization of TFE, but it is preferred to add it to the polymerization system at the time when PTFE has been produced to some extent after initiating the polymerization of TFE. Dispersion stability of PTFE fine particles to be formed immediately after the initiation of polymerization of TFE is considered to be borne by the specific polymer, and dispersion stability of PTFE particles formed thereafter is considered to be mainly borne by the fluorine-free surfactant. The starting time for addition of the fluorine-free surfactant is preferably at a time when from 0.1 to 20 mass % of TFE has been supplied and polymerized to the total amount of TFE to be supplied to the polymerization system, more preferably at a time when from 1 to 10 mass % has been supplied and polymerized. The fluorine-free surfactant may be added all at once to the polymerization system, or may be added dividedly. More preferably, it is dividedly added corresponding to the supply amount of TFE.

The stabilizing aid may be present in the polymerization system at the time of initiating polymerization of TFE. Thus, the stabilizing aid may be added to the polymerization system in step 2 before initiating polymerization of TFE, or as mentioned above, the specific polymer-containing aqueous medium containing the stabilizing aid obtained in step 1 may be used in step 2.

The polymerization temperature of TFE is preferably from 10 to 95° C., more preferably from 15 to 90° C. The polymerization pressure is preferably from 0.5 to 4.0 MPa, more preferably from 0.6 to 3.5 MPa. The polymerization time is preferably from 90 to 520 minutes, more preferably from 90 to 450 minutes.

Steps 1 and 2 may be carried out continuously in the polymerization system in the same polymerization vessel, etc.

Further, in the production method of the present invention, it is sufficient that the specific polymer is formed in step 1, and step 2 may be conducted before the fluorine-free monomer has been completely converted to the polymer in step 1.

Further, substantially the entire amount of TFE to be supplied in step 2 will be polymerized to the polymer. In step 2, the entire amount of TFE to be supplied is measured after the inside of the polymerization system is pressurized to a predetermined pressure by TFE. TFE remaining in the vapor phase and aqueous dispersion in the polymerization system at the completion of step 2 is extremely small relative to the entire amount of TFE supplied in step 2. Accordingly, in the present invention, the proportion of each component to the entire amount of TFE supplied to the polymerization system is substantially equal to the proportion of each component to the polymerized TFE.

By the above procedure, an aqueous dispersion having modified PTFE dispersed in the form of particles (aqueous dispersion containing modified PTFE particles) is obtainable. The concentration of the modified PTFE particles in the aqueous dispersion is preferably from 10 to 45 mass %, more preferably from 15 to 45 mass %, further preferably from 20 to 43 mass %. Within the above range, the modified PTFE particles in the aqueous dispersion can be more easily coagulated, and white turbidity of the coagulation liquid can be suppressed.

The average primary particle size of the modified PTFE particles is preferably from 0.10 to 0.50 µm, more preferably from 0.15 to 0.30 µm, further preferably from 0.20 to 0.30 µm. When the average primary particle size is at least 0.10 µm, paste extrusion molding can be done at a low extrusion pressure, and a molded product having no undulation on the surface and being excellent in surface smoothness can be easily obtained. When the average primary particle size is at most 0.50 µm, since the spaces among the particles during extrusion will be reduced, extrusion stability will be excellent, and as a result, a molded product excellent in surface smoothness can be easily obtained.

The average primary particle size of the modified PTFE particles corresponds to D50 as measured, for example, by a laser scattering method particle size distribution analyzer.
<Modified PTFE Powder>

As a method of obtaining a modified PTFE powder composed of modified PTFE particles (modified PTFE fine powder) from the aqueous dispersion containing modified PTFE particles may, for example, be a method of coagulating modified PTFE particles.

Specifically, for example, by diluting with water so that the concentration of the modified PTFE in the aqueous dispersion containing modified PTFE particles becomes to be from 8 to 25 mass %, the temperature of the aqueous dispersion is adjusted to from 5 to 35° C., and then, the aqueous dispersion is vigorously stirred to coagulate modified PTFE particles. At that time, the pH may be adjusted as the case requires. Further, an coagulating aid such as an electrolyte or a water-soluble organic solvent may be added to the aqueous dispersion.

Thereafter, moderate agitation is conducted, and the coagulated modified PTFE particles are separated from water, and the obtained wet powder (wet fine powder) is granulated and sieved, as the case requires, followed by drying as the case requires. Thus, a modified PTFE powder is obtainable.

The above drying is conducted in a state of not letting the wet powder flow so much, preferably by letting it be left to stand still. The drying method may, for example, be vacuum drying, radio frequency drying or hot air drying.

The drying temperature is preferably from 10 to 300° C., more preferably from 100 to 250° C.

Especially, the drying of the undried modified PTFE powder is preferably carried out in an atmosphere containing ammonia. Here, the atmosphere containing ammonia means an atmosphere in which ammonia gas can be in contact with the undried modified PTFE powder. For example, it means an atmosphere containing ammonia gas, or an atmosphere in which ammonia or a compound which generates ammonia, is dissolved in water containing the undried modified PTFE powder, and ammonia gas will be generated by heating.

The compound which generates ammonia may, for example, be an ammonium salt or urea. Such a compound will be decomposed by heating to generate ammonia gas.

When the undried modified PTFE powder is dried in an atmosphere containing ammonia, without impairing the physical properties, it is possible to lower the paste extrusion pressure of the modified PTFE powder.

<Molded Product>

The modified PTFE as described above is suitably applicable for paste extrusion molding.

The modified PTFE (especially, the modified PTFE powder) is subjected to paste extrusion molding, whereby a desired molded product will be obtained.

The paste extrusion molding is a method in which the modified PTFE powder and a lubricant are mixed, to let the modified PTFE powder have a fluidity, and the mixture is extrusion molded, to form a molded product of, for example, a film or a tube.

The mixing proportion of the lubricant may be suitably selected so that the modified PTFE powder has a fluidity, and, for example, when the total amount of the modified PTFE powder and the lubricant is 100 mass %, it is preferably from 10 to 30 mass %, more preferably from 15 to 20 mass %.

As the lubricant, for example, naphtha or a petroleum type hydrocarbon having a dry point of at least 100° C. is preferred.

To the mixture, an additive such as a pigment may be added for the purpose of coloration, or various fillers may be added for the purpose of imparting e.g. strength and conductivity.

The shape of the molded product may, for example, be tubular, sheet, film or fibrous. Applications may, for example, be tubes, covering for electric wires, sealing materials, porous membranes and filters.

Further, the modified PTFE powder may be paste-extruded to obtain an extruded bead, and the extruded bead may be stretched to obtain a stretched porous material of modified PTFE. The stretching conditions may, for example, be a rate of from 5 to 1,000%/sec and a stretching ratio of at least 500%.

The shape of an article made of the stretched porous material may, for example, be tubular, sheet, film or fibrous.

EXAMPLES

In the following, the present invention will be described in more detail with reference to Examples and Comparative Examples, but the present invention is not limited thereto.

Various measuring methods and evaluation methods are as follows. (A) Average primary particle size (nm) of modified PTFE particles (hereinafter referred to also as "PPS")

Measured by means of a laser scattering method particle size distribution analyzer (manufactured by Horiba, Ltd., trade name "LA-920") by using an aqueous dispersion of modified PTFE particles as a sample.

(B) Standard specific gravity (SSG)

Measured in accordance with ASTM D4895-04.

12.0 g of a sample (modified PTFE powder) was weighed, and held in a cylindrical mold having an inner diameter of 28.6 mm under 34.5 MPa for 2 minutes. This sample was put in an oven of 290° C. and heated at 120° C./hr. Further, after maintaining at 380° C. for 30 minutes, the temperature was lowered at 60° C./hr and held at 294° C. for 24 minutes. The sample was held in a desiccator of 23° C. for 12 hours, then, the specific gravity value to water of the sample at 23° C. was measured, and this value was adopted as the standard specific gravity. As the value of SSG is small, the molecular weight is large.

(C) Measurement of Extrusion Pressure

A modified PTFE powder (100 g) left to stand at room temperature for at least 2 hours, was put into a glass bottle having an internal capacity of 500 mL, and a lubricating oil (Isopar H (registered trademark), manufactured by Exxon Corporation) (21.7 g) was added and mixed for 3 minutes to obtain a mixture. The obtained mixture was left to stand in a 25° C. thermostatic bath for 2 hours, and then subjected to paste extrusion through an orifice at an introduction angle of 30° with a diameter of 2.5 cm and a land length of 1.1 cm at 25° C. under conditions of a reduction ratio (ratio of the cross-sectional area of the inlet to the cross-sectional area of the outlet of the die) of 100 and an extrusion speed of 51 cm/min, to obtain an extruded bead (cord-like material). The pressure required for extrusion at that time was measured and adopted as the extrusion pressure (unit: MPa).

(D) Measurement of Breaking Strength

An extruded bead was obtained in the same manner as in the measurement of the extrusion pressure, and it was dried at 230° C. for 30 minutes, to remove the lubricant. Then, the extruded bead was cut into a suitable length, and both ends were fixed so that the clamp interval became 5.1 cm, followed by heating to 300° C. in an air circulating oven. Continuously, stretching was conducted under conditions of a stretching rate of 100%/sec and a stretching ratio of 2,400%, to obtain a modified PTFE stretched porous material (hereinafter referred to as a stretched bead).

With respect to samples obtainable from the respective ends of the stretched bead (if there is any neck-down in the clamped region, excluding the neck-down), and a sample obtainable from the center of the stretched bead, i.e. a total of three samples, the tensile breaking load forces were, respectively, measured, by means of a tensile tester (manufactured by A&D Company, Limited), and the minimum value was adopted as the breaking strength.

In the measurement by the tensile tester, the sample was sandwiched and fixed by movable jaws having a gauge length of 5.0 cm, and the movable jaws were driven at room temperature (24° C.) at a speed of 300 mm/min to impart a tensile stress.

(E) Measurement of Stress Relaxation Time

Under conditions of a clamp interval of 3.8 cm, a stretching rate of 1,000%/sec and a total stretching of 2,400%, in the same manner as in the measurement of the breaking strength, an extruded bead was stretched, to prepare a sample for measurement of the stress relaxation time. Both ends of this sample were fixed by fixtures and pulled taut to make the total length to be 25 cm. The stress relaxation time was obtained by the time required for this sample to be broken when it was left in an oven of 390° C.

Example 1

In a 100 L stainless steel autoclave, paraffin wax (1,500 g) and deionized water (60 L) were charged. The autoclave was purged with nitrogen and then brought to a reduced pressure, and n-butyl methacrylate (1 g) and deionized water (0.5 L), were poured and charged into the autoclave. Here, n-butyl methacrylate was charged so that the amount of n-butyl methacrylate used, became 48 mass ppm to the total amount of TFE used.

Next, inside of the autoclave was brought to a state of at most the atmospheric pressure, and while stirring the solution in the autoclave, the temperature was raised to 75° C. Thereafter, a solution prepared by dissolving ammonium persulfate (0.11 g) as a polymerization initiator in deionized water (1 L), was injected into the autoclave, to polymerize n-butyl methacrylate.

10 minutes later, the pressure was raised to 1.96 MPa by TFE, and a solution prepared by dissolving ammonium persulfate (0.54 g) and disuccinic acid peroxide (concentration 80 mass %, remainder water) (53 g) in warm water (1 L) of about 70° C., was injected into the autoclave. By 1,379 seconds later, the internal pressure in the autoclave was lowered to 1.89 MPa. Here, the amount of the polymerization initiators (ammonium persulfate and disuccinic acid peroxide) used, was 0.26 mass % to the total amount of TFE used.

Then, TFE was added so as to keep the inner pressure of the autoclave to be 1.96 MPa, to let polymerization of TFE proceed. After adding 1 kg of TFE, a solution prepared by dissolving dodecyl sodium sulfate (44 g) in deionized water (3 L), was supplied while confirming the amount of TFE to be supplied by a flow meter, so that sodium dodecyl sulfate becomes to be from 1.5 to 1.6 g to 1 kg of TFE supplied.

At the time when the amount of added TFE reached 21 kg, the reaction was terminated, and TFE in the autoclave was released to the atmosphere. The polymerization time was 226 minutes.

The obtained aqueous dispersion of modified PTFE was cooled, and the supernatant paraffin wax was removed. The solid content concentration of the aqueous dispersion (concentration of modified PTFE) was about 23 mass %. Further, the average primary particle size of modified PTFE in the aqueous dispersion was 260 nm.

The aqueous dispersion was diluted with pure water to a solid content concentration of 10 mass %, adjusted to 20° C. and stirred, to let modified PTFE particles be coagulated, to obtain a modified PTFE powder. Then, this modified PTFE powder was dried at 250° C.

SSG of the obtained modified PTFE powder was 2.162. The extrusion pressure was 21.6 MPa. The breaking strength was 21.1 N. The stress relaxation time was 180 seconds.

Example 2

An aqueous dispersion of modified PTFE was obtained in accordance with the same procedure as described above (Example 1), except that instead of the treatment in which inside of the autoclave was adjusted to a state of at most the atmospheric pressure, and the solution in the autoclave was heated with stirring to 75° C., treatment was conducted in which inside of the autoclave was pressurized to 0.15 MPa by TFE, and the solution in the autoclave was heated with stirring to 75° C.

Various evaluations are summarized in Table 1.

Example 3

A modified PTFE powder was obtained in accordance with the same procedure as in Example 1 except that n-butyl methacrylate was charged so that the amount of n-butyl methacrylate used became to be 56 mass ppm to the total amount of TFE used, and the amount of TFE used was changed from 21 kg to 18 kg.

Various evaluations are summarized in Table 1.

Example 4

A modified PTFE powder was obtained in accordance with the same procedure as in Example 3 except that n-butyl methacrylate was changed to vinyl acetate.

Various evaluations are summarized in Table 1.

Example 5

A modified PTFE powder was obtained in accordance with the same procedure as in Example 1 except that n-butyl methacrylate was charged so that the amount of n-butyl methacrylate used became to be 83 mass ppm to the total amount of TFE used, and the amount of TFE used was changed from 21 kg to 12 kg.

Various evaluations are summarized in Table 1.

Example 6

A modified PTFE powder was obtained in accordance with the same procedure as in Example 5, except that n-butyl methacrylate was changed to vinyl acetate.

Various evaluations are summarized in Table 1.

Example 7

A modified PTFE powder was obtained in accordance with the same procedure as in Example 1 except that n-butyl methacrylate was changed to acrylic acid, the acrylic acid was charged so that the amount of acrylic acid used became to be 100 mass ppm to the total amount of TFE used, and the amount of TFE used was changed from 21 kg to 10 kg.

Various evaluations are summarized in Table 1.

Example 8

At the time of diluting the aqueous emulsion of modified PTFE in Example 2 with pure water to a concentration of 10 mass %, and then adjusting it to 20° C., followed by stirring to coagulate it, the coagulation was conducted by charging 5 mass % of ammonium carbonate to modified PTFE in the coagulation vessel. Then, the water content of the obtained undried modified PTFE fine powder was measured, and based on that value, in a drying tray, the undried modified PTFE fine powder, and an ammonium carbonate aqueous solution (ammonium carbonate concentration of 20 mass %) to be 5 mass % to the modified PTFE, were simultaneously put, and the obtained drying tray was dried at 285° C.

Using the obtained sample, measurements of the breaking strength and the stress relaxation time were conducted. The breaking strength was 28.2N. The stress relaxation time was 176 seconds.

Comparative Example 1

The preparation of an aqueous dispersion of modified PTFE was attempted by following the same procedure as in Example 1 except that n-butyl methacrylate was not used.

When TFE was added so as to keep the inner pressure of the autoclave to be 1.96 MPa, at the time point when the TFE supply reached 2.6 kg, the polymerization rate became zero, and the polymerization did not substantially proceed. Here, the solid content concentration in water in the autoclave was 0.2 mass %, and an aqueous dispersion of modified PTFE particles was not obtained.

In Table 1, "BMA" represents n-butyl methacrylate, "VAc" represents vinyl acetate, and "AA" represents acrylic acid.

The "amount (mass ppm)" represents the amount of the fluorine-free monomer used (used mass proportion) to the total amount of TFE used.

The "solids (mass %)" represents the solid content concentration of the aqueous dispersion (concentration of modified PTFE).

TABLE 1

|  |  | Example 1 | Example 2 | Example 3 | Example 4 | Example 5 | Example 6 | Example 7 |
|---|---|---|---|---|---|---|---|---|
| Fluorine-free monomer | Type | BMA | BMA | BMA | VAc | BMA | VAc | AA |
|  | Amount (mass ppm) | 48 | 48 | 56 | 56 | 83 | 83 | 100 |
| TFE polymerization conditions | Polymerization time (min.) | 226 | 214 | 171 | 170 | 116 | 115 | 148 |
|  | TFE supply amount (kg) | 21 | 21 | 18 | 18 | 12 | 12 | 10 |
| Various evaluations | Solids (mass %) | 23.3 | 23.5 | 20.7 | 21.4 | 15.4 | 15.4 | 12.9 |
|  | Average primary particle size (μm) | 0.26 | 0.26 | 0.24 | 0.29 | 0.20 | 0.24 | 0.24 |
|  | Standard specific gravity | 2.162 | 2.163 | 2.164 | 2.163 | 2.169 | 2.167 | 2.167 |
|  | Extrusion pressure (MPa) | 21.6 | 22.9 | 23.3 | 21.9 | 24.0 | 23.0 | 23.9 |
|  | Breaking strength (N) | 21.1 | 20.8 | 18.8 | 17.3 | 8.7 | 19.9 | 16.8 |
|  | Stress relaxation time (sec) | 180 | 174 | 157 | 150 | 119 | 120 | 144 |

As shown in Table 1, according to the production method of the present invention, it is possible to efficiently produce a modified PTFE (aqueous dispersion of modified PTFE particles).

This application is a continuation of PCT Application No. PCT/JP2018/035475, filed on Sep. 25, 2018, which is based upon and claims the benefit of priority from Japanese Patent Application No. 2017-187968 filed on Sep. 28, 2017. The contents of those applications are incorporated herein by reference in their entireties.

What is claimed is:

1. A method for producing a modified polytetrafluoroethylene, comprising:
   polymerizing tetrafluoroethylene in an aqueous medium in which a polymer comprising units based on a fluorine-free monomer is present,
   wherein the fluorine-free monomer is represented by the formula (1):

$$CH_2=CR^1\text{-L-}R^2,\qquad\text{Formula (1)}$$

where $R^1$ represents a hydrogen atom or an alkyl group, L represents a single bond, —CO—O—*, —O—CO—* or —O—, * represents a bonding position to $R^2$, and $R^2$ represents an alkyl group, and
   to a total amount of tetrafluoroethylene which is supplied during the polymerizing of tetrafluoroethylene, a proportion of the polymer is from 0.001 to 0.050 mass %.

2. The method according to claim 1, wherein in the formula (1), $R^1$ represents a hydrogen atom or an alkyl group having from 1 to 3 carbon atoms, L represents —CO—O—* or —O—CO—*, * and $R^2$ represents an alkyl group having from 1 to 4 carbon atoms.

3. The method according to claim 1, wherein a content proportion of the units based on the fluorine-free monomer in the polymer is from 90 to 100 mass % to a total amount of monomer units in the polymer.

4. The method according to claim 1, wherein to the total amount of tetrafluoroethylene which is supplied during the polymerizing of tetrafluoroethylene, the proportion of the polymer is from 0.001 to 0.020 mass %.

5. The method according to claim 1, wherein tetrafluoroethylene is polymerized in the presence of a fluorine-free surfactant.

6. The method according to claim 5, wherein the fluorine-free surfactant is a hydrocarbon type surfactant.

7. The method according to claim 5, wherein an amount of the fluorine-free surfactant in the aqueous medium, as expressed as a proportion to the total amount of tetrafluoroethylene which is supplied during the polymerizing of tetrafluoroethylene, is from 0.01 to 0.50 mass %.

8. The method according to claim 5, wherein the fluorine-free surfactant comprises at least one selected from the group consisting of sodium dodecyl sulfate, sodium lauryl sulfate, ammonium lauryl sulfate, polyoxyethylene lauryl ether sodium sulfate, polyoxyethylene lauryl ether ammonium sulfate, sodium dodecylbenzenesulfonate, sodium di(2-ethylhexyl)sulfosuccinate, sodium laurate, and ammonium laurate.

9. The method according to claim 1, wherein tetrafluoroethylene is polymerized in the presence of a stabilizing aid.

10. The method according to claim 1, further comprising, prior to the polymerizing of tetrafluoroethylene:
    polymerizing the fluorine-free monomer in an aqueous medium, thereby obtaining the aqueous medium containing the polymer,
    wherein the polymerizing of tetrafluoroethylene is performed in the obtained aqueous medium containing the polymer.

11. The method according to claim 10, wherein tetrafluoroethylene is polymerized by adding a polymerization initiator to the aqueous medium in which the fluorine-free monomer is polymerized, in such an amount that a proportion of the polymerization initiator becomes to be at least 0.10 mass % to the total amount of tetrafluoroethylene which is supplied during the polymerizing of tetrafluoroethylene.

12. The method according to claim 10, wherein the polymerizing of tetrafluoroethylene is carried out while supplying tetrafluoroethylene to a polymerization system, and a fluorine-free surfactant is added to the polymerization system between the initiation and termination of the supply of tetrafluoroethylene.

13. The method according to claim 10, wherein the aqueous medium in which the fluorine-free monomer is polymerized contains a stabilizing aid, and tetrafluoroethylene is polymerized in the obtained aqueous medium containing the stabilizing aid.

14. The method according to claim 13, wherein the stabilizing aid is a paraffin wax.

15. A method for producing a modified polytetrafluoroethylene powder, comprising:
producing an aqueous dispersion having particles of a modified polytetrafluoroethylene dispersed in an aqueous medium by the method of claim 1; and then
coagulating the particles to produce a powder of a modified polytetrafluoroethylene.

16. A method for producing a stretched porous material, comprising:
producing a modified polytetrafluoroethylene powder by the method of claim 15;
subjecting the modified polytetrafluoroethylene powder to paste extrusion to obtain an extruded bead; and then
stretching the extruded bead to produce a stretched porous material.

17. The method according to claim 15, wherein the particles of the modified polytetrafluoroethylene have an average primary particle size of from 0.10 to 0.50 μm.

18. The method according to claim 1, wherein the fluorine-free monomer is represented by the formula (1-1) or formula (1-2):

$$CH_2=CR^1-CO-O-R^3 \quad \text{Formula (1-1)}$$

$$CH_2=CR^1-O-CO-R^4 \quad \text{Formula (1-2)}$$

where $R^3$ represents an alkyl group having from 1 to 6 carbon atoms, and $R^4$ represents an alkyl group having from 1 to 3 carbon atoms.

19. The method according to claim 1, wherein the fluorine-free monomer is butyl methacrylate or vinyl acetate.

20. The method according to claim 1, wherein tetrafluoroethylene is polymerized without using a fluorinated surfactant.

* * * * *